Oct. 17, 1961    L. VAN DER MEULEN    3,004,881
METHOD AND APPARATUS FOR PERFORMING LOCAL WORKING
AT REGULAR DISTANCES ON A CONTINUOUSLY
ADVANCING WEB OF MATERIAL

Filed Oct. 9, 1956    2 Sheets-Sheet 1

INVENTOR
LEONARD VAN DER MEULEN
BY
ATTORNEY

Oct. 17, 1961  L. VAN DER MEULEN  3,004,881
METHOD AND APPARATUS FOR PERFORMING LOCAL WORKING
AT REGULAR DISTANCES ON A CONTINUOUSLY
ADVANCING WEB OF MATERIAL
Filed Oct. 9, 1956  2 Sheets-Sheet 2

INVENTOR
LEONARD VAN DER MEULEN

BY

ATTORNEY

United States Patent Office 3,004,881
Patented Oct. 17, 1961

3,004,881
METHOD AND APPARATUS FOR PERFORMING LOCAL WORKING AT REGULAR DISTANCES ON A CONTINUOUSLY ADVANCING WEB OF MATERIAL
Leonard van der Meulen, 30 Marie de Molina, Madrid, Spain
Filed Oct. 9, 1956, Ser. No. 614,866
19 Claims. (Cl. 156—253)

The present invention relates generally to a method and apparatus for performing operations at regularly spaced apart locations along continuously advancing web of material. In particular, the invention can be advantageously applied to the producing of transverse sealed strips across longitudinally moving superposed layers of a web or webs of thermoplastic material, which may have the shape of a flat tube. Apparatus is known, wherein the sealed strips are produced by locally applying heat and pressure, and wherein the working elements for applying the heat and pressure move for some distance with the web of material to be treated. As such sealing by heat and pressure takes some time, the working elements have to move for some distance with the web in order to maintain a continuous method.

Increasing the capacity of the apparatus requires an increase in the velocity of the web that has to be treated, in which case the working elements for applying heat and pressure must move with the web over a longer distance, resulting in an unpractical machine with large dimensions.

If it is desired to produce, for example, 20,000 bags/hour having a length of 50 cm. for the packaging of shirts, the velocity of the web has to be about 3 m./sec. This means, that if $\frac{1}{10}$ of a second is necessary for sealing, the stamp or heat and pressure applying elements have to move with the web for a distance of no less than 30 cm. However, even $\frac{1}{10}$ of a second is too short a period for making a safe sealed strip. In fact, in such a short time it is difficult to press and to heat the material and, thereafter, to keep the seal under pressure until the material has been cooled sufficiently to form a joint which is sufficiently reliable, so that the sealed strip, after removing the pressure, will hold during the further transport of the web of material.

Therefore, machines have already been produced which operate intermittently, that is, wherein the movement of the web is temporarily interrupted during each sealing operation.

It is an object of the invention, as compared with the last mentioned intermittently operated machine, to increase the capacity or rate of production by treating a web of material that is continuously supplied, at a high speed. It is a further object of the invention to keep short the distance in the direction of travel of the web over which the latter is treated at the spaced apart locations along the web, while affording a sufficiently long time for the treatment.

One of the primary features of the present invention resides in seizing the web of material that is continuously supplied at a high speed, by a seizing member, that is moving slower than the web, the material supplied in excess behind the seizing member being gathered in a loop and being seized behind the loop by a second seizing member, and so on. During the treatment of the web of material the loops formed as indicated above advance with the seizing members at the speed of the latter, so that, in spite of the high supplying speed, a sufficient time for treatment is obtained. After being worked, the web is released by the seizing members and delivered at a speed equal to the supplying velocity, so that the loops are straightened or taken-up from the web.

With the method according to the invention it has been possible to obtain a supply and delivery velocity of 5500 yards an hour for the web, while a time of treatment of half a second is available at each sealing location. If a shorter time of treatment is sufficient, naturally the production rate can be further increased.

A still further object of the invention is to provide an apparatus which is highly suitable for the application of the new method. A feature of this apparatus resides in the provision of a rotable carrier for the web to be treated having, at is circumference, a number of regularly spaced surfaces separated by spaces in which loops can be housed. According to a still further feature of the invention the spaced apart surfaces of the rotatable carrier constitute the working surfaces for the operation to be performed on the web and the seizing members are formed by pressing means holding the web against the working surfaces of the carrier.

According to a still further feature of the invention each of the pressing means is formed by two spaced strips, each cooperating with a heated strip of the corresponding working surface of the carrier.

Another feature of the invention involves the performing of an operation or treatment apart from the sealing of the web, such as forming a perforation in the web at a location between both strips of each pressing means.

An understanding of the manner in which the above, and other objects, advantages and features of the invention, are attained will appear from the following description of an illustrative embodiment which is to be read in connection with the accompanying drawings, wherein.

Figure 1:
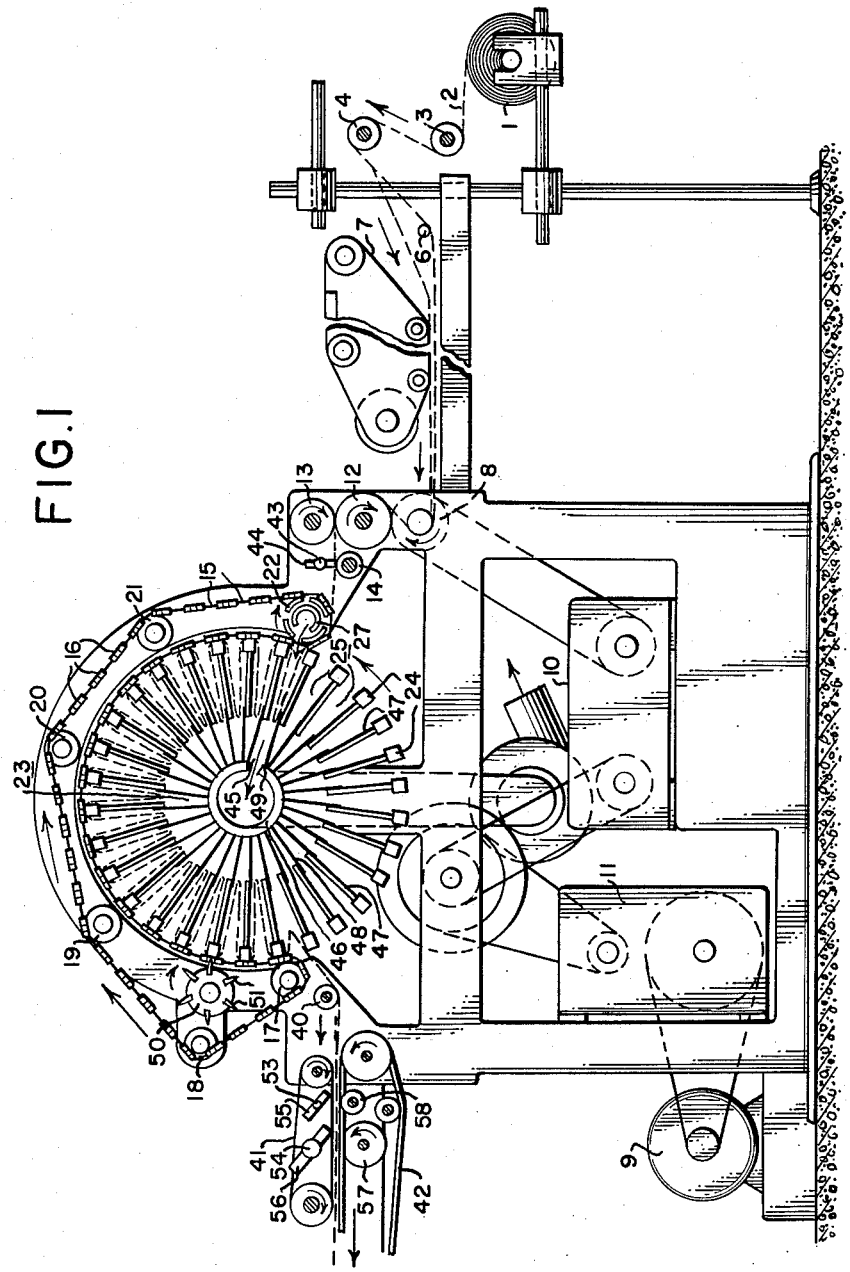
FIG. 1 is a more-or-less diagrammatic view of an apparatus for practicing the method according to the invention.

Referring to the drawings which illustrate a preferred embodiment of an apparatus for practicing the method according to the invention, the web 2 to be worked, is supplied from a coil 1 and consists, for example, of a strip of thin thermoplastic material which has been folded in longitudinal direction to provide two superposed layers joined along one edge and intended to be sealed together at elongated, transverse zones 3 and 3' which are closely adjacent to each other at locations spaced apart in the longitudinal direction of the web. The sealed strips or zones 3 and 3' can be formed by locally pressing together the two layers of the longitudinally folded web 2 transverse to its longitudinal direction while applying controlled electrical heating.

At the right side of apparatus in FIG. 1, the web feeding mechanism is visible wherein the web 2 of thermoplastic material is supplied from the rotatably supported coil 1, and passes over feed rolls 3 and 4. After passing over the roller 4, the web 2 is engaged by a freely rotatable folding pulley 6 imparting a longitudinal fold 5 along the centerline 5' of the web (FIG. 2), the fold 5 being intended to define the bottoms of the bags to be formed. Then the folded web 2 is guided under the horizontally moving part of an endless movable belt 7 which removes wrinkles and warping from the superposed layers of the web. The web 2 is pulled by a roll 8 which is coupled to an electric motor 9 by way of two continuously variable transmissions 10 and 11. From the roll 8, the web 2 passes between two rollers 12 and 13 and then over a roller 14 to an endless conveyor 15 provided at regular intervals with identical pressing members 16. The endless conveyor 15 is guided by rollers 17, 18, 19, 20, 21 and 22 in such a manner that the part of the conveyor 15 directly between the rollers 17 and 22 is urged against a circumferential portion of a rotatable carrier 23 which is provided, at its periphery with identical sealing beams 24 in circumferentially spaced relationship. The beams 24 extend parallel to the axis of rotation (not shown) of the carrier 23. Spaces 25 having a depth of more than half the radius of the carrier 23 are located between the sealing beams 24 and open radially outward. The roller 22 is provided with apertures 26 (FIG. 3) coinciding with the open spaces between the pressing members 16 of the moving endless belt 15. A pipe 27 extends axially within the roller 22 and is provided with a radially opening elongated slit 28 which is directed towards the axis of rotation of the carrier 23, so that, when compressed air is supplied to the pipe 27, a blast of air will issue from the slit 28 thereof. The distance between the beams 24 corresponds exactly to the distance between the members. The web 2 is fed between the beams 24 of the carrier 23 and the pressing members 16 of the conveyor 15, and the circumferential velocity of the carrier 23 corresponds to the speed of advancement of the conveyor 15 and may be one fifth of the speed at which the web 2 is withdrawn from the coil 1. However, this speed relation can be considerably increased. When the web 2 has been locally seized between a beam 24' and a cooperating member 16', the air current or blast, projected from the slit 28 of pipe 27 passes through one of the apertures 26 of roll 22 and blows the excess of web 2, produced by the difference between the supply speed of the web 2 and the velocity of the cooperating carrier 23 and conveyor 15, into the space 25 behind the beam 24'. The excess length of the web 2 in the space 25' forms a loop 29', and, when the web is seized between the next beam 24" and the related pressing member 16", a second loop is formed and so on.

Figure 4:
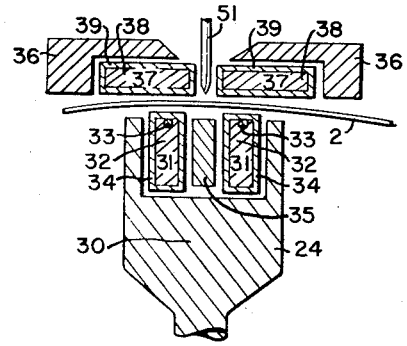
FIG. 4 is a vertical sectional view showing the sealing device.

As is shown more clearly in FIG. 4, each beam 24 comprises a metal supporting member 30 which has a recess opening radially outward for accommodating elements for locally treating the web 2 of material. Projecting slightly out of the recess of supporting member 30 are two spaced parallel heating bars 31 which are each built up of a heat resisting and insulating central part 32 and an electric heating element 33 embedded in the outer face of part 32. Each of the parts 32, together with its heating element 33, is entirely covered by a layer 34 of a suitable plastic, for example, polytetrafluoroethylene, or some other similar electrically insulating, heat resisting and nonadhering material. Between both bars 31 there is clamped a strip of rubber 35.

Each of the cooperating pressing members 16 of the conveyor 15 comprises two metal supporting rims 36 in parallel, spaced relation and each carrying a pressing bar 37 consisting of a metal strip 38 covered with a layer 39 of "Teflon" or similar material.

Figure 2:
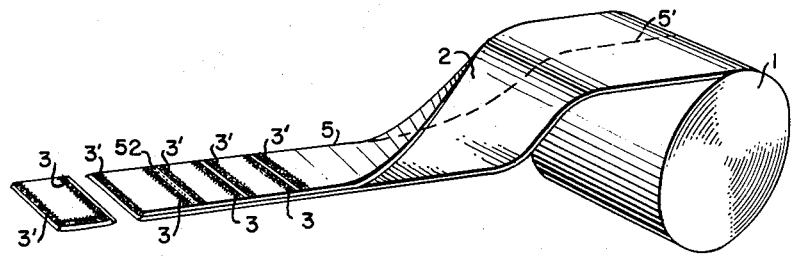
FIG. 2 is a perspective view of a coil of the material to be worked and the successive stages of production of bags therefrom.

The local working of the material results from the doubled web 2 being pressed between the pairs of bars 31 and 37 while the electrical resistance elements 33 are excited and heat the web of material at adjacent zones extending transverse to the direction of travel so that the superposed layers are sealed together along the parallel, closely spaced apart zones or strips 3 and 3'. As the web 2 is closed along its longitudinal folded edge 5, the double sealed strips 3 and 3' define a number of flat bags which are linked to each other at their side edges and which can be separated from each other by cutting the web 2 between the adjacent sealing strips 3 and 3', as indicated in FIG. 2. The flat bags formed as above can be used, for example, for packing gloves, shirts and similar articles. The resistance elements 33 are excited only during an initial part of the period when the beams 24 travel together with the pressing members 16, so that the web is thereafter kept immovably under pressure until it nears the roller 17 to permit cooling and strengthening of the seals 3 and 3' before the web leaves the carrier 23.

Without changing or replacing parts, bags having different dimensions can be made in the same apparatus merely by disconnecting the resistance elements 33 of a member of the sealing beams 24. For example, by heating only the alternate sealing beams, it is possible to obtain bags having a width which is twice that of the bags produced when all resistance heating elements are energized, or by energizing the heating elements of only every third sealing beam 24, bags of triple width can be obtained. It is also possible to obtain successive bags having different widths and produced from the same web, for example, by disconnecting the heating elements of different groups of sealing beams so that successive bags having widths equal to approximately the distance between adjacent beams 24, twice that distance, three times that distance, and so on, can be obtained.

The widths of all bags can be changed very simply by increasing or reducing the velocity of the feed rollers with regard to that of the carrier 23 which advances with the same speed as the belt 15, whereby the lengths of the loops formed in the spaces 25 are increased or reduced.

Further it is obvious that, in principle, the sealing beams 24 and the pressing members 16 can all be mounted on conveyor belts, with the rotated carrier 23 being replaced by an endless belt (not shown), while the loops 29 can be formed by a reciprocating arm (not shown) instead of by the air current from pipe 27.

The illustrated embodiment has the advantage, however, of providing an extremely strong arrangement of the sealing beams 24 in an apparatus occupying a very small space, and such compactness of the apparatus is also due to the fact that the return run of the belt 15 over the rollers 18, 19, 20 and 21 can be arranged in close proximity to the carrier 23.

Further it will be apparent that, in addition to providing highly favorable circumstances for the manufacture of bags of transparent plastic, the method embodying this invention may also be advantageously employed for performing other time-wasting treatments of a web of material at spaced apart locations along the latter, while the web advances continuously, to permit high speeds and consequently high output in a relatively small apparatus. The method and apparatus can be used appropriately when applying relief-prints or strips, or in connection with folding and gluing operations.

Clamping the web against the sealing beams 24 by means of the pressure members 16 provides great reliability and a simple construction, but, under certain circumstances, gripping the web at spaced apart locations along the latter in a continuously running apparatus, while the web is supplied at a speed higher than the speed of movement of the gripping members, so that a loop comes into existence behind each gripping location, can be effected with gripping or seizing means other than the described beams 24 and members 16. For example, the members 16 could be omitted, and the working elements or beams 24 could be provided with openings communicating with a source of vacuum so that the latter holds the web against the working elements.

In the illustrated apparatus, feeding of the web towards severing and bag delivery devices is effected by a roller 40 disposed near the last conveyor roller 17 supporting the belt 15, so that, as the sealed web is released from between belt 15 and carrier 23, the web is again advanced at a speed equal to the input speed, thereby to take-up the slack of the loops 29. After passing around the roller 40, the web 2 travels between two opposed delivery conveyor belts 41 and 42.

Auxiliary devices will now be described which can be advantageously employed in the apparatus and method embodying the present invention.

Figure 3:
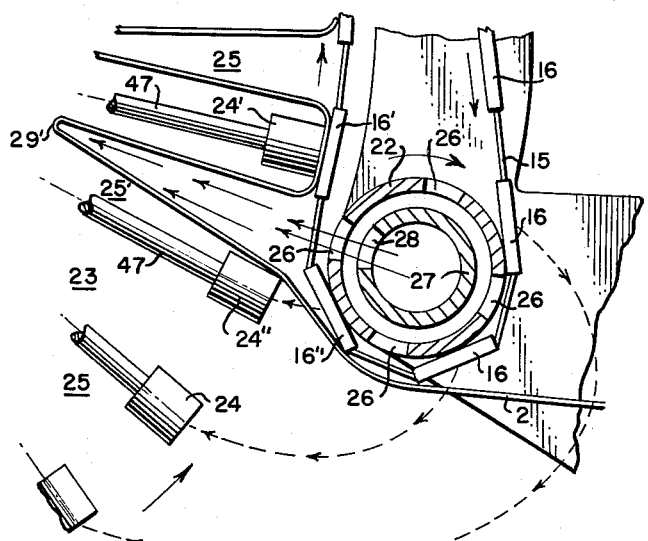
FIG. 3 is a fragmentary diagrammatic enlarged view showing a detail of the device for blowing loops in the web of material to be worked.

It is of the greatest importance that the loops 29, which are blown into the spaces 25, all have the same dimension, because otherwise bags having unequal widths would be produced. In FIG. 3, the formation of the loop 29' has just been completed and immediately thereafter only so much of the length of the web 2 needs to be supplied as will suffice for disposing the web against the next sealing beam 24". For this purpose, an axle 43 is mounted above the roller 14 and is provided with a diametrically extending vane 44, with the rotation of axle 43 being controlled in such a manner that, at the time when the usual rapid supplying of the web to the carrier 23 has to be momentarily interrupted, the web 2 is pressed by the vane 44 against the roller 14 and with the circumferential speeds of the roller 14 and vane 44 corresponding to the supplying speed desired at that moment near the sealing beam 24", which is almost equal to the circumferential velocity of the carrier 23. Thus, loop 29' maintains the desired dimension and, when the member 16" has pressed the web 2 against the beam 24", the vane 44 is angularly displaced away from the roller 14 and the rapid supply for forming the following loop can again take place.

Further in the illustrated apparatus, the formation of the loop by means of the air blast from the pipe 27 is accelerated and more securely achieved, by providing a suction pipe 46 fixedly arranged at the center of the carrier 23 and having a longitudinal slit 45 opening radially in the direction toward the roller 22, thereby to expose to suction the radially inner end of the space 25 in which a loop 29 is then being formed. Each of the beams 24 of the carrier 23 is supported on a radial plate 47 which, at its inner end, carries a resilient plate 48 slidably engaging the surface of the pipe 46 during the rotation of the conveyor 23, thereby to separate the spaces 25 from each other. Further, the pipe 46 has a rim 49 along one edge of the slit 45, so that, during rotation of carrier 23, each successive resilient plate 48 abuts against the rim 49 to prevent closing of slit 45 until the loop 29 has been formed. Thereafter, the plate 48 jumps over the rim 49 and the suction communicated through the slit 45 begins to act on the next space 25. Since an excess supply of the web of material will have accumulated after the member 16 has pressed against the working beam 24, such accumulated excess supply will be drawn in a rapid and reliable manner into the space 25 by means of the cooperation of the air blast through the slit 28 and the suction in the space 25 communicating with the slit 45.

Further, as shown in FIG. 1, a driven working roller 50 is located at the left side of the carrier and is provided, at its circumference, with axially extending groups of radial needles 51 or the like. The circumferential velocity of the ends of the needles 51 is equal to the circumferential velocity of the conveyor 15 and the series of needles 51 are mounted so that the circumferential distance between the ends of the needles equals the distance between the successive pressing members 16, whereby the ends of a group of needles are always projected between strips 36 and bars 37 of a member 16, as shown in FIG. 4. Thus, a transverse row of perforations 52 is formed in the web 2 of material between each pair of sealed strips 3 and 3'. In order to effect such perforation in the right manner, each row of needles 51 is projected through the web 2 into the rubber strip 35 which is situated between each pair of heating bars 31. The perforation of the sealed web of material does not yet divide the web into separate bags, and the transport over the surface of the carrier 23 can continue uninterruptedly while cooling of the sealed strips under continued pressure can be completed. Therefore, perforation of the web can be effected at a time when complete severing of the material and dividing into separate bags, cannot yet be allowed to take place, because the sealed strips could loosen at that stage of the operation. Owing to this a saving of time and space is obtained, because a cutting device separately placed after the conveyor 15 becomes superfluous. The division of the web 2 of material into separate elements or bags can be effected by a device comprising the already mentioned conveyor belts 41 and 42. As a matter of fact, the conveyor belts 41 and 42 consist of separate ropes situated next to each other in laterally spaced relation. Two driven laterally extending axles 53 and 54 are arranged within the closed path of the conveyor belt 41 and carry diametrically directed vanes 55 and 56, respectively, having teeth at their opposite longitudinal edges for engaging between the ropes of conveyor 41. The teeth of vane 56 are disposed a greater radial distance from the axle 54 than the teeth of the vane 55 from the axle 53, so that both axles can have the same speed of rotation, whereas the circumferential speed of the teeth of vane 56 is nevertheless higher than the speed of the teeth of vane 55. The web of material is pressed by the teeth of vane 56 upon a back-up roller 57 and, at the same time, the teeth of the vane 55 presses the web against a back-up roller 58, while a row of perforations 52 is located between the rollers 57 and 58. Since the teeth of vane 56 have a greater circumferential velocity than the teeth of vane 55, a separation is effected along the row of perforations and a bag is separated from the web 2 of material. This separating operation is repeated whenever a row of perforations reaches the area between the rollers 57 and 58 by suitably synchronizing the rotational speed of axles 53 and 54 with the delivery speed of roller 40.

Although a particular embodiment of the invention has been described in detail herein with reference to the accompanying drawings, it is to be noted that the invention is not limited to that precise embodiment, and that various changes and modifications may be effected therein without departing from the scope or spirit of the invention, except as defined in the appended claims.

I claim:
1. A method for heat sealing a continuously moving web of material at locations which are spaced apart along the latter; comprising the steps of continuously supplying the web to a heat sealing zone at a high speed, successively gripping the web at a plurality of locations where the web is to be heat sealed and simultaneously advancing the gripped locations of the web in the direction in which the web is supplied to said heat sealing zone but at a relatively slower speed and with a spacing therebetween, measured in the direction of advancement of the gripped locations, which is smaller than the distance, measured along said web, between the successive gripped locations so that the web between said locations forms loops, heat sealing the web at said gripped locations during the simultaneous advancement of said gripped locations at said relatively slower speed, successively freeing the gripped locations of the web following the completion of the heat sealing of the web at said gripped locations, and taking up said loops by delivering the web from said heat sealing zone at a speed substantially equal to said high speed at which the web is continuously supplied to said heat sealing zone.

2. A method as in claim 1; further comprising perforating the web in said heat sealing zone along transversely extending rows at said gripped locations and, during said delivering of the web from the heat sealing zone, and separating the sections of the web defined between the successive rows of perforations by subjecting the web to relatively large and small accelerations, respectively, in front and in back of each of said rows of perforations.

3. A method as in claim 1; further comprising retarding the speed at which the web is supplied to said heat sealing zone at the moment when gripping of the web is being initially effected to avoid the build-up of an excess of the web during the initiation of the gripping thereof.

4. A method of producing bags from a continuous web of thermoplastic material which is longitudinally folded to provide two superposed layers joined together along one longitudinal side thereof; comprising continuously supplying said folded web to an operation zone and, in said zone, gripping the web at a plurality of successive locations spaced apart along the latter, forming simultaneously existing loops between said gripped locations by conveying said gripped locations simultaneously along a predetermined path through said operation zone at a relatively slower speed while said gripped locations are spaced apart along said path by distances which are substantially smaller than the distances between said gripped locations considered along said folded web, sealing together said superposed layers by applying heat and pressure to said folded web along a pair of transverse, adjacent parallel zones at least at certain of said gripped locations during the conveying thereof at said relatively slower speed, freeing said gripped locations of the web following the sealing together of said superposed layers at said adjacent parallel zones, delivering the web from the operation zone following said freeing of the gripped locations, and dividing the delivered web along transverse lines between said pairs of transverse, adjacent parallel zones with each divided section of the delivered web defining a bag having two layers which are joined together along three edges thereof corresponding to the folded side of the original web and by sealed together zones of the latter, respectively, and opening at a fourth edge of said divided section.

5. A method of producing bags as in claim 4; further comprising perforating the folded web in the operation zone along transversely extending rows between said transverse, adjacent parallel zones during the conveying of said gripped locations at said relatively slower speed; and wherein said dividing of the delivered web is effected by accelerating each section of the web delivered from the operation zone in advance of a row of perforations relative to the section of the delivered web following said row of perforations so as to pull apart the successive sections of the delivered web at said rows of perforations.

6. A method as in claim 4; wherein heat is applied at said adjacent parallel zones only during the movement of the related gripped location along an initial portion of said path, and said zones have an opportunity to cool while still subjected to pressure during movement along the remainder of said path in order to securely seal together said layers, prior to the delivery of the web.

7. An apparatus for heat sealing a continuous web of material at locations which are spaced apart along the latter; comprising means defining an operation zone containing conveying mechanism including gripping means moving continuously along a predetermined path at a relatively slow speed and spaced apart in the direction along said path by distances smaller than that between the locations on the web where the latter is to be heat sealed, means for supplying the web to said conveying mechanism at one end of said path at a relatively high speed where said gripping means grip the web at said locations where the web is to be heat sealed and then convey the gripped locations along said path, while excess lengths of the web form loops between the adjacent spaced apart gripping means, heat sealing means associated with said gripping means and operative to heat seal the web at the gripped locations as the latter are conveyed along said path, and delivery means receiving the heat sealed web from said conveying mechanism and advancing the heat sealed web at a speed substantially equal to said relatively high speed of the web supplying means in order to take-up slack in the web represented by the loops formed in the latter between said gripping means.

8. An apparatus as in claim 7; further comprising a device disposed adjacent said path and operative to perforate the web along rows at the gripped locations during the movement of the latter along said path and wherein said delivery means includes two rotatable conveying devices engaging the delivered web at locations which are spaced apart along the web and means positively driving said two conveying devices at different speeds so that each section of the web in advance of a row of perforations is locally accelerated with respect to the section of the web following said row and the successive sections of the treated web are pulled apart at the rows of perforations therebetween.

9. An apparatus as in claim 7; further comprising pneumatic means directing streams of air against the web between the successive gripping means of said conveying mechanism to induce the excess lengths of the web to form said loops between the gripping means.

10. An apparatus as in claim 7; wherein said conveying mechanism includes a rotatable carrier having a circularly arranged series of circumferentially spaced apart surfaces at the periphery thereof, and a flexible, endless conveyor guided to have a run thereof conforming to a portion of said periphery of the carrier to define said conveyor path and having a series of interconnected, pressing members spaced apart by distances equal to the circumferential spacing between said surfaces of the carrier to confront said surfaces along said path and grip the web against the related surfaces at the locations along the web where the latter is to be heat sealed.

11. An apparatus as in claim 10; wherein said heat sealing means includes heating chambers at said periphery of the carrier extending parallel to the axis of rotation of the carrier and defining said series of circumferentially spaced apart surfaces for cooperation with said pressing members in applying heat and pressure to the web therebetween.

12. An apparatus as in claim 11; wherein each of said heating members includes a pair of parallel, spaced apart heated bars and each of said pressing members also has a pair of parallel, spaced apart bars adapted to register with said heated bars of the related heating member so that, at each gripped location along the web, heat sealing is effected along a pair of transverse, adjacent parallel zones.

13. An apparatus as in claim 12; further comprising a web perforating device including a rotated support disposed adjacent said path and having rows of radially extending needles projecting therefrom to project between said bars of the successive pressing members and form transverse rows of perforations in the web between each pair of adjacent parallel zones along which the web is heat sealed so that successive sections of the web can be separated from each other at the weakened lines defined by the rows of perforations.

14. An apparatus as in claim 13; further comprising separating means associated with said delivery means and including positively rotated first and second conveying devices engaging the heat sealed web at successive locations which are spaced apart in the direction of travel of the web, said second conveying device being driven at a higher speed than said first conveying device so that each section of the web in advance of a row of perforations is locally accelerated, and thus separated with respect to the section of the web following the row of perforations.

15. An apparatus as in claim 10; further comprising a retarding device engageable with the web between said web supplying means and said one end of the conveyor path, said retarding device including a rotated conveying device which is positively driven with approximately the same circumferential speed as the carrier and intermittently seizes the advancing web so as to momentarily retard the speed of movement of the web toward said one end of the path down to said relatively slow speed during the initial gripping of the web between one of said surfaces of the carrier and the related pressing member of said conveyor.

16. An apparatus as in claim 10; further comprising pneumatic means directing an air stream against the web at said one end of the conveyor path to urge the loops of the web into radially outward opening space defined in said rotatable carrier between the adjacent spaced apart surfaces of the latter.

17. An apparatus as in claim 16; wherein said conveyor includes a guide roller rotatably mounted at said one end of said path with said series of interconnected, spaced apart pressing members running around said roller, said roller having radial opening slits therein registering with the spaces between said pressing members; and wherein said pneumatic means includes an axial pipe within said roller adapted to receive compressed air and having a radially opening slit therein directed toward the axis of rotation of said carrier to direct said air stream against the web following the gripping of the latter between a surface of said carrier and a related pressing member of said conveyor.

18. An apparatus as in claim 17; further comprising a non-rotatable, axial pipe located centrally within said carrier and adapted for connection with a source of vacuum, said pipe within the carrier having a longitudinal slit opening radially in the direction toward said guide roller; and wherein said carrier further includes a series of generally radially directed resilient plates extending inwardly from said surfaces and slidably engaging the surface of said central pipe within the carrier so that, as each space between adjacent surfaces at the periphery of the carrier moves past said one end of the conveyor path, the radially inner end of said space defined between adjacent resilient plates is communicated with said slit of the central pipe to expose the space to the effect of vacuum for assisting said air stream in inducing the web to form a loop in said space.

19. An apparatus as in claim 18; wherein said central pipe within said carrier has a radially outward directed rim along the edge of the related slit disposed at the side of the latter opposed to the direction of rotation of said carrier and operative to flex the inner end edge of a resilient plate engaging said rim to extend the period of communication between said slit of the central pipe and a space defined, in part, by the flexed resilient plate.

References Cited in the file of this patent

UNITED STATES PATENTS

| | | |
|---|---|---|
| 1,908,823 | Daniell | May 16, 1933 |
| 2,163,265 | Townsend | June 20, 1939 |
| 2,206,965 | Lakso | July 9, 1940 |
| 2,229,121 | Nye et al. | Jan. 21, 1941 |
| 2,492,530 | Kreigsheim | Dec. 27, 1949 |
| 2,538,520 | Holt et al. | Jan. 16, 1951 |
| 2,544,044 | Reber et al. | Mar. 6, 1951 |
| 2,680,471 | Mercer | June 8, 1954 |
| 2,720,246 | Piazze | Oct. 11, 1955 |
| 2,737,999 | Schjeldahl | Mar. 13, 1956 |
| 2,749,817 | Piazze et al. | June 12, 1956 |
| 2,750,987 | Weisenburg | June 19, 1956 |
| 2,815,063 | La Fleur | Dec. 3, 1957 |

FOREIGN PATENTS

| | | |
|---|---|---|
| 767,610 | Great Britain | Feb. 6, 1957 |